UNITED STATES PATENT OFFICE.

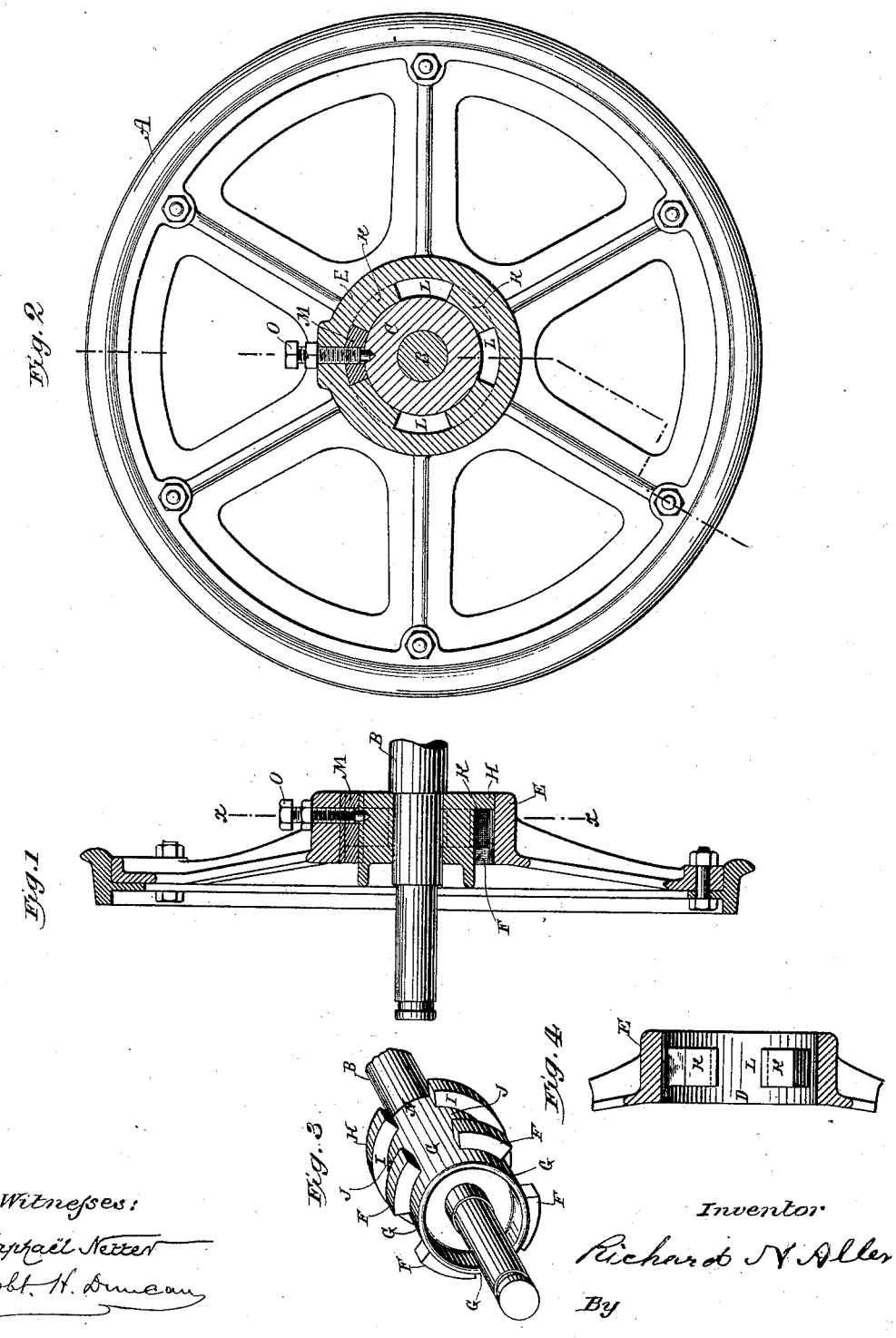

RICHARD N. ALLEN, OF CLEVELAND, OHIO.

CAR-WHEEL.

SPECIFICATION forming part of Letters Patent No. 421,471, dated February 18, 1890.

Application filed November 18, 1889. Serial No. 330,749. (No model.)

*To all whom it may concern:*

Be it known that I, RICHARD N. ALLEN, of the city of Cleveland, in the county of Cuyahoga and State of Ohio, have invented a new and useful Improvement in Car-Wheels, of which the following is a specification.

The present invention relates to that class of car-wheels in which the wheels are detachably secured to their axles in such manner that in case of the breakage of a wheel or its failure from ordinary wear a new wheel can be readily substituted without the use of special tools and appliances.

It is very desirable, especially in street-cars, that the wheels and axles be made interchangeable, so that any wheel will readily fit upon any axle, and can be effectively and at the same time detachably secured thereto. Screwthreaded axles and correspondingly-screwthreaded hub or axle spaces at the center of the wheels have been devised for this purpose, and various means for preventing the parts from unscrewing have been suggested, among which is a retaining-key driven into a longitudinal slot formed partly in the axle and partly in the hub or axle space wall; also set-screws have been suggested passed into holes through the hub and into the axle. The main defect in these constructions arises from the extreme difficulty in so cutting the screw-threads on the wheels relatively to the screw-threads on the axles that when any special wheel is screwed home upon its axle the part of the key-slot in the axle will exactly match or register with its corresponding part in the wheel, or the screw-holes in the one part will register with those of the other part. This defect is in practice so serious as to defeat the desirable feature of interchange of parts.

It is the object of the present invention to overcome this defect by so constructing the wheels and axles at their union with each other that they can, under all ordinary conditions, be readily interchanged; and to this end my invention consists, generally, in forming projections and grooves upon the axle and within the hub or axle space, so that when the wheel and axle are brought together the projections on the one part can enter and pass along the grooves of the other part till the wheel has reached its position on the line of the axle, and then the wheel can be rotated upon the axle, or the axle can be turned within the wheel to bring the projections on the wheel and axle into abutment or alignment with each other, and thus lock the wheel and axle securely together; also in the means by which the wheel and axle, after they have been interlocked, are prevented from turning upon or relatively to each other.

My invention is illustrated in the accompanying drawings, in which—

Figure 1 is a central sectional view of a car-wheel containing my invention. Fig. 2 is mainly a view in elevation of the inner side of the wheel, the central portion being a section through line $x\,x$ of Fig. 1. Fig. 3 is a perspective view of the interlocking-axle construction, and Fig. 4 is a sectional view of the corresponding part of the hub or axle space of the wheel.

In the drawings, A represents a car-wheel of any general construction, in which the tire may be removable or cast with the body of the wheel, and the body may be of a continuous piece of metal, or may be of the usual spoked construction.

The present invention relates particularly to the central portion of the wheel where it is seated upon the axle, and to that part of the axle which is united to the wheel, in which B represents the axle proper, having the usual journals projecting beyond the wheels.

C is an enlargement on the axle, adapted to enter the hub or axle space D in the center of the wheel and to be secured therein.

E is the hub of the wheel.

The enlargement C on the axle is preferably made as a separate part from the axle B, and after being finished or partly finished is pressed or shrunk in place on the axle, forming a tight sleeve thereon. It is provided, by casting or otherwise, with projections F, separated by grooves G running in the direction of the length of the axle. It is also provided with a flange H, having a shoulder I. This flange H is separated from the projections F by a groove J, concentric with the axle B, and the outer or top surfaces of the flange and projections are concentric with the axle and are made to fit closely within the hub or axle space D of the wheel.

The hub-space D is provided with projections K, separated by grooves L, the projections and grooves having such relation in size and proportion and position to the grooves and projections G and F on the axle that when the wheel is pushed into position on the axle the projections F will pass along and through the grooves L, and the projections K will pass along and through the grooves G, the projections on the wheel passing by those on the axle. The shoulder I of the flange H acts as a stop or abutment to the projections K, and the distance between this shoulder and the ends of the projections F adjacent such shoulder is substantially equal to the length of the projections K in the hub-space, so that when the wheel is thrust upon the axle and its movement is stopped by the contact of the ends of the projections K with shoulder I the projections K will lie wholly within the line of the concentric groove J and the projections F will lie just beyond the line of the projections K.

When the several parts are in the position last named, the wheel can be rotated on the axle, or the axle can be turned in the hub or axle space, which will bring the ends of the projections F and K into abutment and alignment with each other and the opposite ends of the projections K against the shoulder or stop I, and the wheel and axle will be securely interlocked against any pull or thrust in the line of the axle.

In order to secure the interlocked parts from turning upon each other, as well as to bring and hold them in close contact, I make use of a retaining-key M, shaped in cross-section to fill one of the grooves made by bringing one set of the grooves G and L into alignment. This key is preferably made slightly tapering, and may be driven into place with sufficient force to take up and retain all lost motion between the parts. I prefer to cut a groove N through the flange H, as this aids in removing the key.

The key may be held in place by a set-screw O, passing through the hub and into the key, and, if desired, through the key and into the axle. If necessary, several keys may be used.

It is observed that when the parts are interlocked and the key is in place, as described and shown in the drawings, the key is in close contact with the sides of the projections both of the axle and of the wheel, and consequently prevents any turning or rotary movement of the parts relatively to each other.

In the drawings I have shown four interlocking projections on the wheel and axle; but I do not wish to limit my invention to this or to any specific number, as it is evident that a greater or less number can be used to make the desired union. It is also evident that the shape and size of the projections and their corresponding grooves can be largely varied from those shown in the drawings without departing from the principle of my invention, which consists in giving such relative conformation to the hub-space of the wheel and to the engaging part of the axle that the wheel can be slipped home upon the axle and then be turned to cause the projecting parts to interlock. It is also evident that there can be an interchange of the construction of the hub-space and the axle by varying the location of the parts—that is, the locking construction, as shown on the axle, may be transferred to the wheel and that on the wheel to the axle—and the operation remain substantially the same.

What is claimed as new is—

1. The combination, substantially as set forth, of projections in the hub or axle space of a car-wheel and projections secured to the axle, and a stop secured to the axle or the wheel, whereby when the wheel is pushed onto the axle the projections of the respective parts will pass each other, and by turning the wheel and axle relatively to each other they will be interlocked.

2. The combination, substantially as set forth, of a shoulder or stop I, secured to a car-wheel axle, and projections K, secured to the wheel, for the purpose set forth.

3. The combination, substantially as set forth, of the grooves N, L, and G when in alignment, and a retaining-key in contact with the walls of such grooves.

RICHARD N. ALLEN.

Witnesses:
ROBT. H. DUNCAN,
ROBT. F. GAYLORD.